(12) United States Patent
Marappan

(10) Patent No.: US 11,983,429 B2
(45) Date of Patent: May 14, 2024

(54) MIGRATION PROCESSES UTILIZING MAPPING ENTRY TIMESTAMPS FOR SELECTION OF TARGET LOGICAL STORAGE DEVICES

(71) Applicant: Dell Products L.P., Round Rock, TX (US)

(72) Inventor: Gopinath Marappan, Coimbatore (IN)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 17/846,242

(22) Filed: Jun. 22, 2022

(65) Prior Publication Data
US 2023/0418500 A1    Dec. 28, 2023

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,003,527 B1 | 2/2006 | Lavallee et al. | |
| 7,275,103 B1 | 9/2007 | Thrasher et al. | |
| 7,397,788 B2 | 7/2008 | Mies et al. | |
| 7,454,437 B1 | 11/2008 | Lavallee et al. | |

(Continued)

FOREIGN PATENT DOCUMENTS

| CN | 103677927 B | 2/2017 |
|---|---|---|
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Stephanie Wu
(74) *Attorney, Agent, or Firm* — Ryan, Mason & Lewis, LLP

(57) ABSTRACT

A method comprises maintaining a mapping data structure comprising a plurality of mapping entries, each such mapping entry associating an assigned name of a corresponding logical storage device of a storage system with a unique identifier of that logical storage device, a given such mapping entry further comprising a timestamp associated with the logical storage device. The method further comprises identifying a source logical storage device for a migration process, accessing the mapping data structure to determine a timestamp of the source logical storage device and one or more additional timestamps of one or more respective candidate target logical storage devices for the migration process, selecting based at least in part on the determined timestamps a particular one of the one or more candidate target logical storage devices, and initiating the migration process to migrate the source logical storage device to the selected target logical storage device.

20 Claims, 6 Drawing Sheets

```
pseudoDev pick_target_lun (pseudoDev source_dev)
{
    pseudoDev dev;
      foreach dev in list of luns in mapping database
    {
        if (source_dev != dev)
        {
            if ( size(dev) >= size(source_dev) )
            {
                if ( timestamp(dev) > timestamp(source_dev) )
                {
                    print ("Do you want to migrate data from source dev
name=%s (size=%d, timestamp=%s) to target dev name=%s (size=%d, timestamp=%s)
?", source_dev.name, source_dev.size, source_dev.timestamp, dev.name,
dev.size, dev.timestamp);

userInput = getUserInput();
                    if ( userInput == 'yes' )
                    {
                        return dev;
                    }
                }
            }
        }
    }
    /* No device was selected as target dev by user or no suitable devices
were available */
    return NULL;
}
```

(56) References Cited

U.S. PATENT DOCUMENTS

| | | | |
|---|---|---|---|
| 7,617,292 B2 | 11/2009 | Moore et al. | |
| 7,668,981 B1 | 2/2010 | Nagineni et al. | |
| 7,689,787 B2 * | 3/2010 | Nakase | G06F 3/0635 |
| | | | 711/148 |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,819,307 B1 | 8/2014 | Raizen et al. | |
| 8,825,919 B1 | 9/2014 | Lim et al. | |
| 8,832,334 B2 | 9/2014 | Okita | |
| 8,874,746 B1 | 10/2014 | Gonzalez | |
| 8,959,249 B1 | 2/2015 | Love | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,712,613 B2 | 7/2017 | Balasubramanian et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,523,513 B2 | 12/2019 | Bennett et al. | |
| 10,564,870 B1 * | 2/2020 | Greenwood | G06F 3/0647 |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 11,050,660 B2 | 6/2021 | Rao et al. | |
| 11,093,144 B1 | 8/2021 | Anchi et al. | |
| 11,093,155 B2 | 8/2021 | Anchi et al. | |
| 11,106,381 B2 | 8/2021 | Rao et al. | |
| 11,308,004 B1 | 4/2022 | Rao et al. | |
| 2001/0054093 A1 | 12/2001 | Iwatani | |
| 2002/0023151 A1 | 2/2002 | Iwatani | |
| 2002/0103923 A1 | 8/2002 | Cherian et al. | |
| 2003/0179227 A1 | 9/2003 | Ahmad et al. | |
| 2003/0188233 A1 * | 10/2003 | Lubbers | G06F 11/2069 |
| | | | 714/100 |
| 2003/0195956 A1 | 10/2003 | Bramhall et al. | |
| 2003/0208581 A1 | 11/2003 | Behren et al. | |
| 2004/0010563 A1 | 1/2004 | Forte et al. | |
| 2004/0057389 A1 | 3/2004 | Klotz et al. | |
| 2004/0073648 A1 | 4/2004 | Tanino et al. | |
| 2004/0081186 A1 | 4/2004 | Warren et al. | |
| 2006/0026346 A1 | 2/2006 | Kadoiri et al. | |
| 2006/0036736 A1 | 2/2006 | Kitamura et al. | |
| 2006/0106819 A1 | 5/2006 | Dhanadevan et al. | |
| 2006/0129876 A1 | 6/2006 | Uemura | |
| 2006/0277383 A1 | 12/2006 | Hayden et al. | |
| 2007/0174849 A1 | 7/2007 | Cheung et al. | |
| 2007/0239989 A1 | 10/2007 | Barnett et al. | |
| 2007/0242617 A1 | 10/2007 | Ichimura | |
| 2007/0294563 A1 | 12/2007 | Bose | |
| 2008/0043973 A1 | 2/2008 | Lai et al. | |
| 2008/0147893 A1 | 6/2008 | Marripudi et al. | |
| 2008/0201458 A1 | 8/2008 | Salli | |
| 2008/0244174 A1 | 10/2008 | Abouelwafa et al. | |
| 2008/0301332 A1 | 12/2008 | Butler et al. | |
| 2009/0006780 A1 | 1/2009 | Sato et al. | |
| 2009/0259749 A1 | 10/2009 | Barrett et al. | |
| 2009/0282135 A1 | 11/2009 | Ravindran et al. | |
| 2010/0049934 A1 * | 2/2010 | Tomita | G06F 3/0689 |
| | | | 711/E12.001 |
| 2010/0131950 A1 | 5/2010 | Yamada et al. | |
| 2010/0199053 A1 * | 8/2010 | Otani | G06F 3/0644 |
| | | | 711/170 |
| 2010/0313063 A1 | 12/2010 | Venkataraja et al. | |
| 2011/0161520 A1 | 6/2011 | Horiuchi et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0163374 A1 | 6/2012 | Shah et al. | |
| 2012/0246345 A1 | 9/2012 | Contreras et al. | |
| 2013/0019001 A1 | 1/2013 | Winokur | |
| 2013/0046892 A1 | 2/2013 | Otani | |
| 2013/0117766 A1 | 5/2013 | Bax et al. | |
| 2013/0121161 A1 | 5/2013 | Szabo et al. | |
| 2013/0339551 A1 | 12/2013 | Flanagan et al. | |
| 2014/0105068 A1 | 4/2014 | Xu | |
| 2014/0122755 A1 | 5/2014 | Chandra et al. | |
| 2015/0089015 A1 | 3/2015 | Rosset et al. | |
| 2015/0207673 A1 | 7/2015 | Cui et al. | |
| 2015/0222705 A1 | 8/2015 | Stephens | |
| 2015/0242134 A1 | 8/2015 | Takada et al. | |
| 2015/0319245 A1 | 11/2015 | Nishihara et al. | |
| 2016/0050277 A1 | 2/2016 | Kirk et al. | |
| 2016/0092136 A1 | 3/2016 | Balakrishnan et al. | |
| 2016/0117113 A1 | 4/2016 | Li et al. | |
| 2016/0246749 A1 | 8/2016 | Kobashi | |
| 2016/0335003 A1 | 11/2016 | Ahmed et al. | |
| 2016/0380804 A1 | 12/2016 | Amano | |
| 2017/0134220 A1 | 5/2017 | Chen et al. | |
| 2017/0220406 A1 | 8/2017 | Parnell et al. | |
| 2017/0235507 A1 | 8/2017 | Sinha et al. | |
| 2018/0004425 A1 | 1/2018 | Suzuki | |
| 2018/0026863 A1 | 1/2018 | Hughes et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0020603 A1 | 1/2019 | Subramani et al. | |
| 2019/0095299 A1 | 3/2019 | Liu et al. | |
| 2019/0108888 A1 | 4/2019 | Sarkar et al. | |
| 2019/0319846 A1 | 10/2019 | Dhanadevan et al. | |
| 2019/0334987 A1 | 10/2019 | Mallick et al. | |
| 2020/0021653 A1 | 1/2020 | Rao et al. | |
| 2020/0021654 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0157502 A1 | 5/2021 | Rao et al. | |
| 2021/0181965 A1 | 6/2021 | Anchi et al. | |
| 2021/0263665 A1 | 8/2021 | Rao et al. | |
| 2021/0297363 A1 | 9/2021 | Charles et al. | |
| 2022/0164121 A1 * | 5/2022 | Gallaher | G06F 3/0683 |
| 2022/0171559 A1 | 6/2022 | Anchi et al. | |

(56) References Cited

OTHER PUBLICATIONS

International Search Report and Written Opinion of PCT/US2019/053204 dated Dec. 16, 2019, 40 pages.
International Search Report and Written Opinion of PCT/US2019/053473 dated Dec. 19, 2019, 16 pages.
International Search Report and Written Opinion of PCT/US2019/067144 dated May 4, 2020, 26 pages.
Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
Wikipedia, "Fibre Channel Zoning," https://en.wikipedia.org/wiki/Fibre_Channel_zoning, Aug. 19, 2020, 2 pages.
E. Smith, "Introducing Target Driven Zoning (TDZ)" https://brasstacksblog.typepad.com/brass-tacks/2012/01/introducing-target-driven-zoning-tdz.html, Jan. 16, 2012, 9 pages.
Broadcom, "Fabric Operating System 9.0," Technical Brief, Fabric Notifications, FOS-90-Fabric-Notifications-OT101, Nov. 4, 2020, 12 pages.
Brocade, "Brocade Guide to Undertanding Zoning," vol. 1, 2002, 27 pages.
A. Wasson, "General Rules and Limits for Auto-Provisioning on Symmetric VMAX," http://community.emc.com/docs/DOC-16553, May 8, 2012, 2 pages.
NVM Express, "NVM Express Base Specification, Revision 2.0b," NVM Express, Jan. 6, 2022, 455 pages.
E. Goggin et al., "Linux Multipathing," Proceedings of the Linux Symposium, vol. 1, 2005, 21 pages.
K. Ueda et al., "Request-based Device-mapper Multipath and Dynamic Load Balancing," Proceedings of the Linux Symposium, vol. 2, 2007, 9 pages.
U.S. Appl. No. 17/501,433 filed in the name of Gopinath Marappan et al. filed Oct. 14, 2021, and entitled "Non-Disruptive Migration of Logical Storage Devices in a Linux Native Multi-Pathing Environment."

\* cited by examiner

400

| 410 | 402 | 404 |
|---|---|---|
| 2019_09_19_12:34:57 | emcpowerd | WWN2 |
| 2019_09_19_12:34:57 | emcpowere | WWN1 |
| 2019_09_19_12:34:57 | emcpowerp | WWN7 |
| 2019_09_19_12:34:57 | emcpowerq | WWN9 |
| 2019_09_19_12:34:57 | emcpowerr | WWN11 |
| 2022_01_19_09:12:34 | emcpowerl | WWN15 |
| 2022_01_19_09:12:35 | emcpowerm | WWN10 |
| 2022_01_19_09:12:35 | emcpowern | WWN8 |
| 2022_01_19_09:12:35 | emcpowero | WWN13 |
| 2022_01_19_09:12:35 | emcpowerg | WWN27 |
| 2022_01_19_09:12:36 | emcpowerf | WWN14 |
| 2022_01_19_09:12:36 | emcpowerh | WWN6 |

FIG. 4

```
check_timestamps_of_luns(pseudoDev source_dev , pseudoDev target_dev)
{
    if (timestamp(target_dev) <= timestamp(source_dev) )
    {
        print ("Warning: target lun appears to be older than source lun.");
        print ("Use '-force' option to setup the migration if migration between these luns still needs to be done.");
    }
}
```

FIG. 5

```
pseudoDev pick_target_lun (pseudoDev source_dev)
{
    pseudoDev dev;
    foreach dev in list of luns in mapping database
    {
        if (source_dev != dev)
        {
            if ( size(dev) >= size(source_dev) )
            {
                if ( timestamp(dev) > timestamp(source_dev) )
                {
                    print ("Do you want to migrate data from source dev name=%s (size=%d, timestamp=%s) to target dev name=%s (size=%d, timestamp=%s)?", source_dev.name, source_dev.size, source_dev.timestamp, dev.name, dev.size, dev.timestamp);
                    userInput = getUserInput();
                    if ( userInput == 'yes' )
                    {
                        return dev;
                    }
                }
            }
        }
    }
    /* No device was selected as target dev by user or no suitable devices were available */
    return NULL;
}
```

FIG. 6

MIGRATION PROCESSES UTILIZING MAPPING ENTRY TIMESTAMPS FOR SELECTION OF TARGET LOGICAL STORAGE DEVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols.

SUMMARY

Illustrative embodiments provide techniques that utilize mapping entry timestamps to prevent errors in migration processes. A given such migration process can involve, for example, migration of a first logical storage device to a second logical storage device, in the same storage system or between two different storage systems.

Some embodiments disclosed herein address problems that arise in conventional migration processes. For example, in conventional migration processes, mistakes can arise that may lead to loss of data. As a more particular illustration of such a mistake, an administrator or other user may inadvertently configure a migration from an "old" source logical storage device to an "old" target logical storage device, illustratively created earlier in time than the source logical storage device, instead of to a "new" target logical storage device that was created later in time than the source logical storage device. This configuration mistake can result in the data in the "old" target logical storage device being overwritten and lost. Similar issues can arise in numerous other migration scenarios.

In some embodiments, at least portions of a migration process are implemented within or otherwise utilizing a multi-path layer of at least one host device. The multi-path layer illustratively comprises at least one multi-path input-output (MPIO) driver configured to process IO operations of at least one host device that communicates with one or more storage arrays or other types of storage systems.

In one embodiment, an apparatus comprises at least one processing device comprising a processor and a memory coupled to the processor. The at least one processing device is configured to maintain a mapping data structure comprising a plurality of mapping entries, each such mapping entry associating an assigned name of a corresponding logical storage device of a storage system with a unique identifier of that logical storage device, a given such mapping entry further comprising a timestamp associated with the logical storage device. The at least one processing device is further configured to identify a source logical storage device for a migration process, to access the mapping data structure to determine a timestamp of the source logical storage device and one or more additional timestamps of one or more respective candidate target logical storage devices for the migration process, to select based at least in part on the determined timestamps a particular one of the one or more candidate target logical storage devices, and to initiate the migration process to migrate the source logical storage device to the selected target logical storage device.

In another embodiment, a method comprises maintaining a mapping data structure comprising a plurality of mapping entries, each such mapping entry associating an assigned name of a corresponding logical storage device of a storage system with a unique identifier of that logical storage device, a given such mapping entry further comprising a timestamp associated with the logical storage device. The method further comprises identifying a source logical storage device for a migration process, accessing the mapping data structure to determine a timestamp of the source logical storage device and one or more additional timestamps of one or more respective candidate target logical storage devices for the migration process, selecting based at least in part on the determined timestamps a particular one of the one or more candidate target logical storage devices, and initiating the migration process to migrate the source logical storage device to the selected target logical storage device. The method is performed by at least one processing device comprising a processor coupled to a memory.

The at least one processing device illustratively comprises at least a portion of at least one host device coupled to the storage system via at least one network.

The at least one host device illustratively comprises a multi-path layer, with the multi-path layer comprising at least one MPIO driver configured to control delivery of IO operations from the at least one host device to the storage system over selected paths through the network.

These and other illustrative embodiments include, without limitation, apparatus, systems, methods and computer program products comprising processor-readable storage media.

BRIEF DESCRIPTION OF THE DRAWINGS

FIG. 4 shows an example of a data structure comprising mapping entry timestamps for respective logical storage devices in an illustrative embodiment.

FIG. 5 shows example pseudocode for checking if a target logical storage device is newer than a source logical storage device in conjunction with configuration of a migration process in an illustrative embodiment.

FIG. 6 shows example pseudocode for selecting a target logical storage device for use with a source logical storage device in conjunction with configuration of a migration process in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
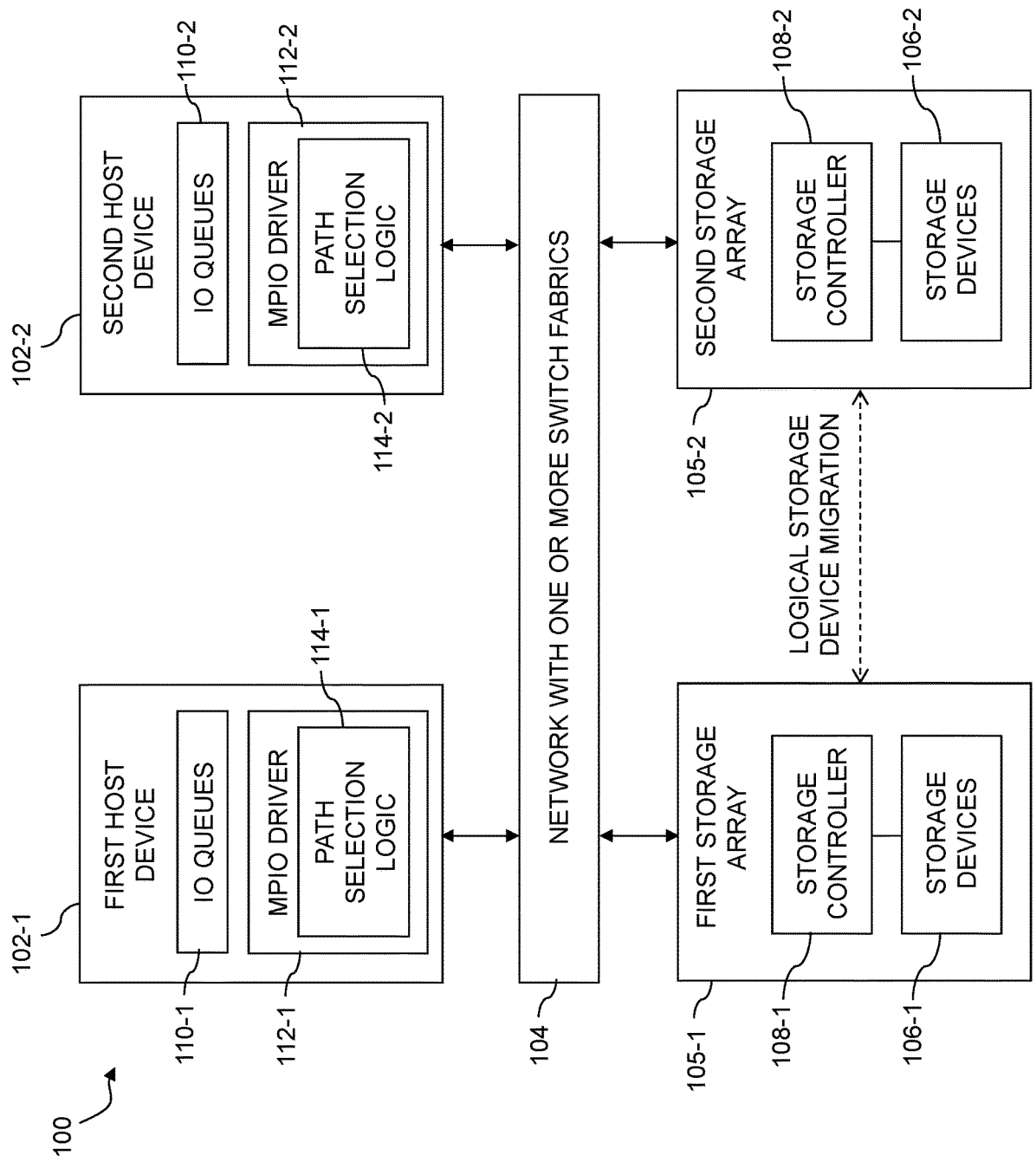
FIG. 1 is a block diagram of an information processing system configured with functionality for migration from a source logical storage device to a target logical storage device utilizing mapping entry timestamps in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices.

The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

It is assumed in illustrative embodiments that the host devices 102 and storage arrays 105 are configured to support migration of logical storage devices between the first and second storage array 105, as indicated by the horizontal dashed line in the figure. Other types of migration can be supported in other embodiments, such as migration of logical storage devices within a given one of the storage arrays 105. In accordance with a given migration process, at least one source logical storage device is migrated to at least one target logical storage device, utilizing mapping entry timestamps as disclosed herein.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe access protocol, as described in the NVMe Base Specification, Revision 2.0b, Jan. 6, 2022, which is incorporated by reference herein. Other storage access protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

In some embodiments, it is assumed that the storage controllers 108 of the respective storage arrays 105 each comprise replication control logic and a snapshot generator.

The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides path selection functionality for operations using respective instances of path selection logic 114-1 and 114-2 implemented within the MPIO drivers 112, and also illustratively provides related migration functionality utilizing mapping entry timestamps as disclosed herein.

In some embodiments, the multi-path layer additionally supports migration of logical storage devices of the storage arrays 105. Such migration functionality may be implemented at least in part in the multi-path layer, and may additionally or alternatively be implemented in migration control logic of the host devices 102 and storage arrays 105.

The MPIO drivers 112 may comprise, for example, otherwise conventional MPIO drivers, such as PowerPath® drivers from Dell Technologies, suitably modified in the manner disclosed herein to support migration utilizing mapping entry timestamps. Other types of MPIO drivers from other driver vendors may be suitably modified to incorporate migration functionality utilizing mapping entry timestamps as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath™ drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also illustratively configured to implement at least portions of the migration functionality of host device 102-1, utilizing mapping entry timestamps as disclosed herein. Other host device components, such as migration control logic implemented in one or more host device processors, can additionally or alternatively implement aspects of the migration functionality of the host device 102-1. The disclosed embodiments are therefore not limited to embodiments in which migration functionality utilizing mapping entry timestamps is controlled at least in part by an MPIO driver or multi-path layer.

As indicated previously, migration of logical storage volumes or other logical storage devices under conventional practice can be problematic.

For example, in conventional migration processes, mistakes can arise that may lead to loss of data. As a more particular illustration of such a mistake, an administrator or other user may inadvertently configure a migration from an "old" source logical storage device to an "old" target logical storage device, illustratively created earlier in time than the source logical storage device, instead of to a "new" target logical storage device that was created later in time than the source logical storage device. This configuration mistake can result in the data in the "old" target logical storage device being overwritten and lost. Similar issues can arise in numerous other migration scenarios.

Illustrative embodiments disclosed herein advantageously address and overcome such problems that arise in conventional migration processes.

In accordance with the migration functionality disclosed herein, a given one of the host devices 102, illustratively the host device 102-1, is configured to maintain a mapping data structure comprising a plurality of mapping entries, with each such mapping entry associating an assigned name of a corresponding logical storage device of at least one of the storage arrays 105 with a unique identifier of that logical storage device. A given such mapping entry further comprises a timestamp associated with the logical storage device. An example of a mapping data structure comprising entries of this type will be described in more detail below in conjunction with the illustrative embodiment of FIG. 4.

The host device 102-1 is further configured to identify a source logical storage device for a migration process, to access the mapping data structure to determine a timestamp of the source logical storage device and one or more additional timestamps of one or more respective candidate target logical storage devices for the migration process, to select based at least in part on the determined timestamps a particular one of the one or more candidate target logical storage devices, and to initiate the migration process to migrate the source logical storage device to the selected target logical storage device.

The host device 102-1 is an example of what is more generally referred to herein as "at least one processing device" that includes a processor coupled to a memory. Other types and arrangements of one or more processing devices may be utilized in other embodiments to implement the disclosed migration functionality.

At least a portion of the migration functionality in illustrative embodiments is implemented within or otherwise utilizing the MPIO driver 112-1. For example, the MPIO driver 112-1 in some embodiments is configured to maintain the above-noted mapping data structure, and to select a particular target logical storage device for use in a given migration process utilizing mapping entry timestamps of the mapping data structure.

Although MPIO driver 112-1 is utilized to perform certain aspects of the migration functionality in some embodiments, this is by way of illustrative example only, and other embodiments need not utilize MPIO drivers in implementing such functionality. For example, Linux native multi-pathing arrangements utilizing device mappers can be configured in some embodiments to implement migration processes utilizing mapping entry timestamps as disclosed herein.

In some embodiments, the mapping data structure comprises at least a portion of a mapping database. Such a mapping database is illustratively stored in persistent storage of the host device 102-1, possibly as part of its root file system, although it may additionally or alternatively be stored elsewhere in the system 100.

The assigned name of a given one of the logical storage devices in its corresponding mapping entry illustratively comprises a pseudo device name of the given logical storage device. Such pseudo device names may be assigned in some embodiments by the MPIO driver 112-1 of the host device 102-1. Other types of assigned names may be used in the mapping entry for the logical storage device in other embodiments.

The unique identifier of a given one of the logical storage devices in its corresponding mapping entry illustratively comprises a world-wide name (WWN) identifier of the given logical storage device. Other types of unique identifiers may be used in the mapping entry for the logical storage device in other embodiments.

In some embodiments, the timestamp associated with a given one of the logical storage devices in its corresponding mapping entry illustratively indicates a creation time of the given logical storage device.

Additionally or alternatively, the timestamp associated with the given logical storage device in its corresponding mapping entry illustratively indicates a time at which the given logical storage device is initially recognized by an install instance of the MPIO driver 112-1 of the host device 102-1. This recognition time of the given logical storage device can be different than the creation time of the given logical storage device. For example, the logical storage device may be created at a particular point of time, and then a new install instance of the multi-path software comprising MPIO driver 112-1 may be subsequently deployed on the host device 102-1, such that the install instance of the MPIO driver 112-1 first recognizes the given logical storage device at a point in time after its creation time.

It should be noted that the particular examples given above for mapping entries, including the assigned names, unique identifiers and timestamps for respective logical storage devices, are presented by way of illustration only, and can be varied in other embodiments. Mapping databases and other types of mapping data structures as those terms are broadly used herein can include numerous other arrangements of additional or alternative entries of different types. For example, a given entry can include multiple timestamps for its corresponding logical storage device, such as a first timestamp for its creation time and a second timestamp for a subsequent recognition time by the MPIO driver 112-1.

In some embodiments, selecting based at least in part on the determined timestamps comprising selecting a particular one of a plurality of candidate target logical storage devices that has a timestamp that is later in time than the timestamp of the source logical storage device.

Additionally or alternatively, selecting based at least in part on the determined timestamps comprising selecting a particular one of a plurality of candidate target logical storage devices at least in part responsive to user input.

In some embodiments, the host device 102-1 is configured to initiate the migration process and to execute the migration process to migrate the source logical storage device to the selected target logical storage device. This is an example of a host-based migration process. A given such host-based migration process can be carried out at least in part utilizing PowerPath ° Migration Enabler (PPME) or other suitable migration software. Some host-based migration processes may require cooperation between host and storage administrators.

In other embodiments, the host device 102-1 is configured to initiate the migration process, but the migration process once initiated is executed by one or more of the storage arrays 105. This is an example of a storage-based migration process. A more particular example of a storage-based migration process is referred to as Non-Destructive Migration (NDM). Some storage-based migration processes avoid the need for cooperation between host and storage administrators, but typically require device spoofing.

More particularly, such storage-based migration processes can require the target device to spoof the source device identifier or ID. This spoofing may pose problems in some implementations with multiple storage arrays since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as those carried out using the above-noted PPME allow the target device to keep its own device ID, as the MPIO driver 112-1 can merge the two device IDs into a single device ID for presentation to a host device processor layer, thereby avoiding problems associated with spoofing.

Additional techniques for addressing these and other issues that may arise in certain migration processes are disclosed in U.S. patent application Ser. No. 17/106,788, filed Nov. 30, 2020 and entitled "Automated Seamless Migration Across Access Protocols for a Logical Storage Device," which is incorporated by reference herein.

The above-noted host-based and storage-based migration processes are only illustrative examples, and numerous other types and configurations of migration processes can be used in other embodiments.

In some embodiments, the host device 102-1 is configured to generate a warning responsive to the timestamp of the source logical storage device being later in time than at least one of the one or more additional timestamps of one or more respective candidate target logical storage devices. For example, the host device 102-1 can generate a display on a user interface that provides such a warning to an administrator or other user responsive to user entry of information relating to a potential target logical storage device that has a timestamp that is earlier in time than that of the source logical storage device.

Additionally or alternatively, the host device 102-1 in some embodiments is configured to present a force option to a user, in order to allow the user to select a particular one of a plurality of candidate target logical storage devices that has a timestamp that is earlier in time than the timestamp of the source logical storage device. For example, in conjunction with presentation of the above-noted warning to the user via the user interface, the host device 102-1 can also provide the user with an option to select the potentially problematic target storage device, and to thereby essentially override the recommendation of the host device 102-1 that a different target logical storage device, having a timestamp that is later in time than that of the source logical storage device, be selected.

Although the above-described migration functionality is primarily described in the context of host device 102-1 and its MPIO driver 112-1, it is assumed that similar functionality is implemented by host device 102-2 and its MPIO driver 112-2. Moreover, the disclosed techniques can involve interaction between at least one of the host devices 102 and at least one of the storage arrays 105 in carrying out a migration process utilizing a target logical storage device selected based at least in part utilizing mapping entry timestamps.

It should be noted that references in the above description and elsewhere herein to single instances of source and target logical storage devices are non-limiting, and other embodiments can migrate multiple source logical storage devices to respective target logical storage devices, through straightforward modification of the techniques disclosed herein, as will be readily apparent to those skilled in the art.

As indicated above, the above-described migration functionality utilizing mapping entry timestamps is illustratively carried out at least in part utilizing the MPIO driver 112-1 and its path selection logic 114-1. For example, in some embodiments, the migration functionality can be implemented substantially entirely under the control of the MPIO driver 112-1, and in such embodiments the path selection logic 114-1 is illustratively configured to control performance of one or more steps of the flow diagram to be described below in conjunction with FIG. 2. Additional or alternative host device components, such as migration control logic implemented in the host device, can be used to control performance of a migration process utilizing mapping entry timestamps, such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed migration functionality.

Accordingly, aspects of migration functionality described above in the context of the first MPIO driver 112-1 and the first host device 102-1 are assumed to be similarly performed by the other MPIO driver 112-2 and the other host device 102-2.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the migration functionality.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising a host device and a storage system. The host device illustratively comprises a given one of the first and second host devices 102-1 and 102-2 of FIG. 1, and the storage system illustratively comprises one or both of the storage arrays 105, with each such storage array comprising a plurality of storage devices. The storage devices of each such storage array are assumed to include logical storage devices such as LUNs or other logical storage volumes.

Figure 2:
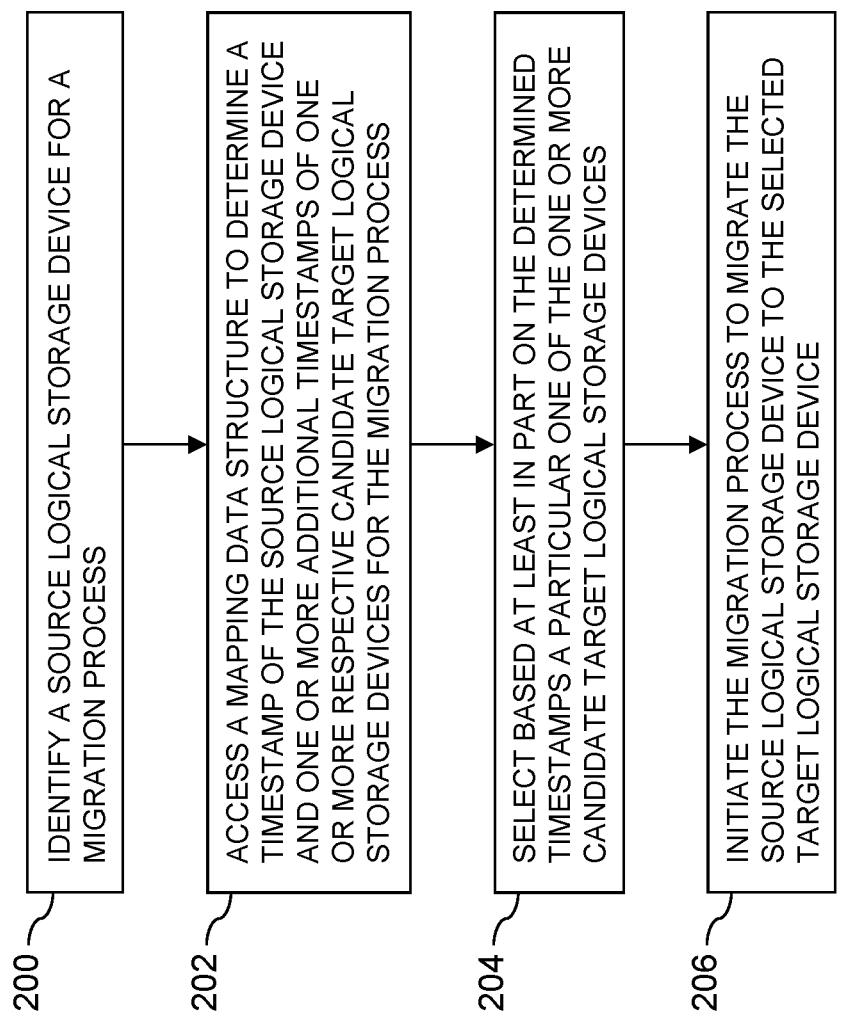
FIG. 2 is a flow diagram of a process for migration from a source logical storage device to a target logical storage device utilizing mapping entry timestamps in an illustrative embodiment.

The steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components can control or perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in the FIG. 2 process and elsewhere herein.

In step 200, a source logical storage device for a migration process is identified. The identification of the source logical device can be made at least in part responsive to input received from an administrator or other user via a user interface of the host. The migration process can be configured, for example, to migrate the source logical storage device to a particular target logical storage device, to be determined in steps 202 and 204 utilizing mapping entry timestamps as disclosed herein, where the target logical storage device is in the same storage system as the source logical storage device, or in a different storage system. With reference to the FIG. 1 embodiment, the source and target logical storage devices may be in different ones of the storage arrays 105, or in the same one of the storage arrays 105. Each of the logical storage devices illustratively comprises a LUN or other type of logical storage volume implemented using one or more storage devices 106 of one or more of the storage arrays 105.

In step 202, a mapping data structure is accessed to determine a timestamp of the source logical storage device and one or more additional timestamps of one or more respective candidate target logical storage devices for the migration process. The mapping data structure comprises a plurality of mapping entries, with each such mapping entry associating an assigned name of a corresponding logical storage device of a storage system with a unique identifier of that logical storage device. At least a subset of such mapping entries each further comprise a timestamp associated with that logical storage device.

In step 204, based at least in part on the determined timestamps, a particular one of the one or more candidate target logical storage devices is selected. For example, in some embodiments, the determined timestamps are utilized to select a target logical storage device having a timestamp that is later in time than the timestamp of the source logical storage device. Such a selection may be made from a plurality of candidate target logical storage devices, each of at least a subset of which has a timestamp that is later in time than the timestamp of the source logical storage device. Additionally or alternatively, the selection may be made based at least in part on user input from an administrator or other user. In an example of such an arrangement, the plurality of candidate target logical storage devices, each of at least a subset of which has a timestamp that is later in time than the timestamp of the source logical storage device, can be presented to a user via a user interface of the host, with the user interface being configured to receive user input regarding selection of a particular one of the candidate logical storage devices. Numerous alternative selection arrangements, including fully automated arrangements that do not utilize any user input, can be implemented in a given embodiment. For example, a given embodiment can be configured to automatically select, from the plurality of candidate target logical storage devices, the particular target logical storage device that has a timestamp closest to the current time. Terms such as "select" and "selecting" as used herein are therefore intended to be broadly construed, so as to encompass, for example, a wide variety of different arrangements for determining a particular target logical storage device for use in a migration process, from among multiple potential target logical storage devices.

In step 206, the migration process to migrate the source logical storage device to the target logical storage device is initiated. For example, the migration process can be initiated and executed by the host, in the case of a host-based migration process. As another example, the migration process can be initiated by the host and executed by one or more storage arrays, in a storage-based migration process. Any of a wide variety of different migration processes can be used in embodiments herein. For example, a given migration process can substantially simultaneously migrate multiple source logical storage devices to respective target logical storage devices, with each such target logical storage device being selected for its corresponding source logical storage device in the manner described above.

The steps of the FIG. 2 process are shown in sequential order for clarity and simplicity of illustration only, and certain steps can at least partially overlap with other steps. Also, one or more of the steps referred to as being performed by a particular system component, such as an MPIO layer comprising one or more MPIO drivers, can in other embodiments be performed at least in part by one or more other system components.

As indicated above, different instances of the FIG. 2 process can execute at least in part in parallel with one another for different migration processes involving different source and target logical storage devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and migration functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different migration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
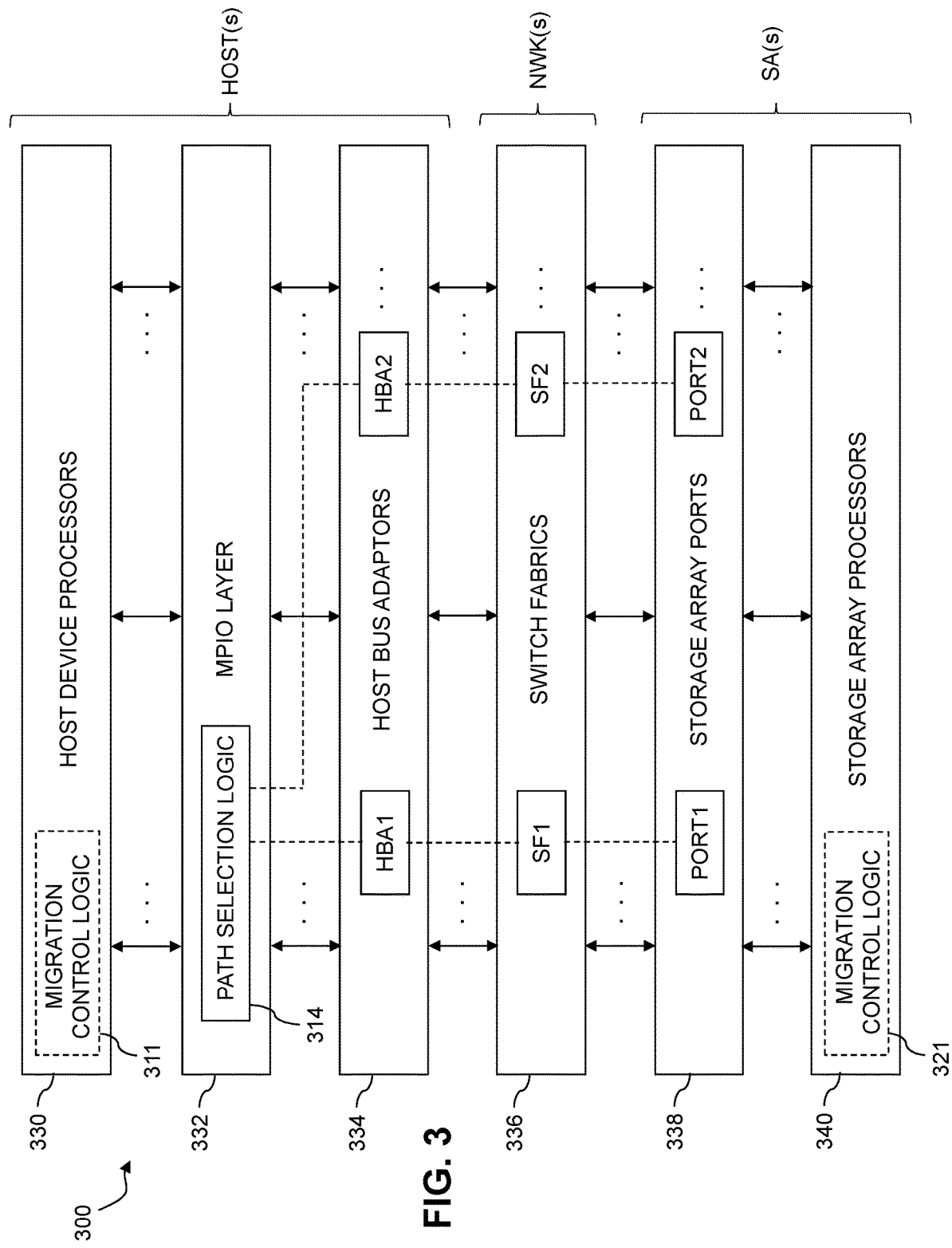
FIG. 3 is a block diagram showing multiple layers of a layered system architecture that includes migration functionality utilizing mapping entry timestamps in an illustrative embodiment.

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for migration of logical storage volumes or other logical storage devices utilizing mapping entry timestamps. The logical storage devices store data for one or more application processes running in one or more host device processors of the host device processor layer 330. The migration functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host device processor layer 330 controls host-based migration processes of the system 300. The host-side migration control logic 311 can include multiple distinct migration control logic instances for respective ones of a plurality of host devices of the system 300.

The storage-side migration control logic 321 implemented in the storage array processor layer 340 controls storage-based migration processes of the system 300. The storage-side migration control logic 321 can include multiple distinct migration control logic instances for respective ones of a plurality of storage arrays of the system 300.

The host-side and storage-side migration control logic 311 and 321 are illustratively configured to implement at least portions of the migration functionality utilizing mapping entry timestamps as disclosed herein. These components are shown in dashed outline in the figure, as they can be implemented in different locations within the system 300, or in a distributed manner across multiple locations. For example, the host-side migration control logic 311, although illustratively shown as part of the host device processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side and storage-side migration control logic 311 and 321 in implementing at least portions of the migration functionality utilizing mapping entry timestamps as disclosed herein. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300, through their respective instances of migration control logic 311 or 321, provide migration functionality utilizing mapping entry timestamps as disclosed herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional examples of migration processes, illustratively implemented at least in part utilizing host-side migration control logic 311, storage-side migration control logic 321 and/or an MPIO layer such as MPIO layer 332 of the FIG. 3 embodiment, will now be described with reference to FIGS. 4, 5 and 6.

In these illustrative examples, migration of a source logical storage device to a target logical storage device is provided, with the target logical storage device being selected based at least in part on respective timestamps of the source logical storage device and the target logical storage device. It will be assumed for these examples that the logical storage devices comprise respective LUNs.

As indicated previously, in conventional migration processes, mistakes can arise that may lead to loss of data. For example, an administrator or other user may incorrectly configure a migration from an old LUN to another old LUN instead of to a new LUN. This configuration mistake can result in the data in the target LUN being overwritten and lost.

Illustrative embodiments herein provide techniques that illustratively involve storing, in each of a plurality of records in a LUN identifier to pseudo device name mapping database, a corresponding timestamp (e.g., data and/or time information) that indicates when the LUN was first added to a given multi-pathing configuration of a multi-path layer of the host device. This timestamp is then used to determine whether or not a given LUN is newly added relative to a source LUN, and therefore an appropriate target LUN, during migration setup. The timestamp for the given LUN may more specifically denote, for example, a time at which the corresponding record was created in the LUN identifier to pseudo device name mapping database.

The time of creation of such a mapping record in some embodiments corresponds to the time the LUN was first added to the host. This may not be true if, for example, a LUN was previously added to the host and then a fresh install of PowerPath® was done. In this particular case, the time of creation of the mapping record reflects the first time that the freshly-installed instance of PowerPath® saw that LUN.

Referring now to FIG. 4, an example of a mapping data structure 400 is shown. The mapping data structure 400 illustratively comprises at least a portion of a mapping database, which may be stored in persistent storage of a given one of the hosts of the system 300. The mapping data structure 400 comprises a plurality of entries, each corresponding to a different LUN and illustratively representing a different record of the mapping database, with a given such entry comprising a mapping between a particular one of a plurality of assigned names 402 and a particular one of a plurality of unique identifiers 404. The mapping data structure 400 illustratively serves to map the assigned names 402 to their respective unique identifiers 404 for each of the different LUNs.

The mapping data structure 400 in accordance with techniques disclosed herein further associates mapping entry timestamps 410 with respective ones of the assigned names 402 and unique identifiers 404 of the respective LUNs. The mapping entry timestamps 410 in this embodiment include date and time information, although a wide variety of other timestamp formats can be used. Also, mapping entries of the mapping data structure 400 in some embodiments can include multiple timestamps of different types.

In this embodiment, the assigned names 402 more particularly comprise respective pseudo device names (e.g., "emcpowerd," "emcpowere," "emcpowerp," . . . ) of the respective LUNs. Such pseudo device names are illustratively assigned to the respective LUNs by an MPIO driver of the host. The unique identifiers 404 more particularly comprise respective WWN identifiers (e.g., WWN2, WWN1, WWN7, . . . ) of the respective LUNs. Other types and arrangements of assigned names and unique names can be used in the mapping data structure 400 in other embodiments.

The host utilizes the mapping entry timestamps 410 of the mapping data structure 400 to identify at least one target LUN for at least one source LUN in at least one migration process, in a manner similar to that described elsewhere herein. More particularly, the host accesses the mapping data structure to determine a timestamp of the source LUN and one or more additional timestamps of one or more respective candidate target LUNs for the migration process, selects based at least in part on the determined timestamps a particular one of the one or more candidate target LUNs, and initiates the migration process to migrate the source LUN to the selected target LUN.

In some embodiments, when a migration setup is done, the host device checks the timestamp of when the source LUN was created and when the target LUN was created and generates a warning under particular specified conditions, which may include, for example, one or more of the following:

1. The source LUN timestamp is newer than the target LUN timestamp.
2. The target LUN is older than a specified threshold number of days, hours or other time units.

Additional or alternative conditions may be specified in other embodiments.

A "force" option may be provided in some embodiments, with required actuation by an administrator or other user in order to actually complete the migration setup, so as to ensure that the user is highly aware of any potential problem.

FIG. 5 shows example pseudocode for checking if a target LUN is newer than a source LUN in conjunction with configuration of a migration process in an illustrative embodiment. This pseudocode is illustratively executed by the host, possibly by an MPIO driver of the host. In this example, the pseudocode first checks the timestamps of respective source and target LUNs, and if the timestamp of the target LUN is less than or equal to the timestamp of the source LUN, the pseudocode generates a warning (e.g., "target LUN appears to be older than source LUN") for presentation on a user interface of the host. The host user interface may be part of an administrator terminal or other user terminal coupled to the host, and the term "user interface" referred to herein is therefore intended to be broadly construed. The pseudocode also advises the user to use an available "force" option to complete the migration setup using the potentially problematic target LUN, if necessary.

Additionally or alternatively, an option to select from among multiple relatively new LUNs for use with migration from a particular source LUN can be added. Such functionality can determine the timestamp of the source LUN and only list newer LUNs than that as potential target LUNs for selection by a user, or for automatic selection by an algorithm, while also performing one or more additional checks, such as confirming that the potential target LUNs are each of the same or bigger size than the source LUN.

FIG. 6 shows example pseudocode for selecting a target LUN for use with a source LUN in conjunction with configuration of a migration process in an illustrative embodiment. This pseudocode is also illustratively executed by the host, possibly by an MPIO driver of the host. In this example, the pseudocode, for each of a plurality of potential target LUNs (e.g., all LUNs other than the source LUN in a mapping database), determines if the target LUN is of appropriate size (e.g., equal to or greater in size than the source LUN), and has a timestamp that is greater than that of the source LUN, and if so presents information identifying that target LUN via a user interface as an option for selection by a user.

Responsive to user selection of a particular target LUN, the pseudocode returns information identifying that target LUN, and otherwise one or more additional target LUN options, if any such options are available, are presented via the user interface. If the user does not select any available option as the target LUN, or no suitable target LUNs are available, the pseudocode returns a null result as indicated.

The particular pseudocode arrangements of FIGS. 5 and 6 are presented by way of illustrative example only, and a wide variety of additional or alternative arrangements can be implemented in a given embodiment for selection of a particular target LUN, with or without user input.

These and other embodiments disclosed herein provide advantages over alternative techniques such as checking memory timestamps saved in a kernel portion of a host operating system when new LUNs are added, because if the corresponding host device is rebooted, then any such kernel timestamps are lost.

Moreover, illustrative embodiments provide advantages relative to checking if the target LUN pseudo device name is "later" than the source LUN pseudo device name (e.g., assuming that a pseudo device named "emcpowerp" is a newer device than a pseudo device named "emcpowera"), as such an approach will not work in scenarios where devices are frequently added and/or removed, since the pseudo device names can be reused. The pseudo device names therefore do not accurately reflect the relative times at which the source LUN and target LUN were added to a given multi-pathing configuration.

An example algorithm for implementing the mapping entry timestamp techniques to prevent migration mistakes illustratively includes the following steps, although additional or alternative steps can be used in other embodiments, and the ordering of the steps can be varied in other embodiments:

1. A migration setup is initiated by identifying a particular source LUN to be migrated to a target LUN.
2. A data structure containing the timestamps of the source LUN and one or more target LUNs is accessed. The data structure illustratively comprises at least a portion of a mapping database of the type described above.
3. One or more candidate target LUNs having timestamps that are later in time than the timestamp of the source LUN are identified.
4. A particular one of the candidate target LUNs is selected for use as the target LUN for the migration.
5. The migration process migrates the source LUN to the selected target LUN having a timestamp that is later in time than the timestamp of the source LUN.

Such an arrangement advantageously ensures that the particular target LUN selected for utilization in the migration process is an appropriate target LUN to use for migration of the particular source LUN. This avoids mistakes that might otherwise lead to loss of data if, for example, a target LUN having a timestamp that is earlier than the timestamp of the source LUN were to be used in the migration process.

The above-described algorithm is presented by way of illustrative example only, and other embodiments can use other types of algorithms to provide the disclosed functionality for mapping entry timestamp techniques to prevent migration mistakes.

The MPIO driver portions of the above process may be similarly performed by other MPIO drivers on respective other host devices. Such MPIO drivers illustratively form a multi-path layer comprising multi-pathing software of the host devices.

Again, the above algorithm is presented by way of illustrative example only, and other embodiments can utilize additional or alternative steps. Also, certain steps illustrated as being performed serially can instead be performed at least in part in parallel with one another.

Advantageously, illustrative embodiments can prevent migration mistakes that might otherwise arise absent use of the disclosed mapping entry timestamp and associated migration-related functionality.

The particular migration arrangements described above are presented by way of illustrative example only. Numerous alternative arrangements of these and other features can be used in implementing migration functionality utilizing mapping entry timestamps in other embodiments.

It is apparent from the foregoing that the illustrative embodiments disclosed herein can provide a number of significant advantages relative to conventional arrangements.

For example, some embodiments configure host devices to include functionality for migration utilizing mapping entry timestamps, so as to avoid inadvertent overwriting of data and other mistakes that might otherwise arise in configuring a migration process.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as an Amazon Web Services (AWS) system, a Google Cloud Platform (GCP) system and a Microsoft Azure system. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations, mapping entries, timestamps, and associated migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
    at least one processing device comprising a processor coupled to a memory;
    said at least one processing device being configured:
    to maintain a mapping data structure comprising a plurality of mapping entries, each such mapping entry associating an assigned name of a corresponding logical storage device of a storage system with a unique identifier of that logical storage device, a given such mapping entry further comprising a timestamp associated with the logical storage device;
    to identify a source logical storage device for a migration process;
    to access the mapping data structure to determine a timestamp of the source logical storage device and one or more additional timestamps of one or more respective candidate target logical storage devices for the migration process;
    to select based at least in part on the determined timestamps a particular one of the one or more candidate target logical storage devices; and
    to initiate the migration process to migrate the source logical storage device to the selected target logical storage device;
    wherein the mapping data structure comprises at least one entry for a respective at least one candidate target logical storage device having a timestamp that is earlier in time than the timestamp of the source logical storage device, and the selecting is configured to prevent inadvertent utilization in the migration process of the at least one candidate target logical storage device having the timestamp that is earlier in time than the timestamp of the source logical storage device.

2. The apparatus of claim 1 wherein the mapping data structure comprises at least a portion of a mapping database.

3. The apparatus of claim 1 wherein the assigned name of a given one of the logical storage devices comprises a pseudo device name of the given logical storage device.

4. The apparatus of claim 1 wherein the unique identifier of a given one of the logical storage devices comprises a world-wide name (WWN) identifier of the given logical storage device.

5. The apparatus of claim 1 wherein the timestamp associated with a given one of the logical storage devices indicates a creation time of the given logical storage device.

6. The apparatus of claim 1 wherein the timestamp associated with a given one of the logical storage devices indicates a time at which the given logical storage device is initially recognized by an install instance of a multi-path input-output driver of said at least one processing device.

7. The apparatus of claim 1 wherein selecting based at least in part on the determined timestamps comprising selecting a particular one of a plurality of candidate target logical storage devices that has a timestamp that is later in time than the timestamp of the source logical storage device.

8. The apparatus of claim 1 wherein selecting based at least in part on the determined timestamps comprising selecting a particular one of a plurality of candidate target logical storage devices at least in part responsive to user input.

9. The apparatus of claim 1 wherein said at least one processing device is further configured to execute the migration process to migrate the source logical storage device to the selected target logical storage device.

10. The apparatus of claim 1 wherein said at least one processing device comprises at least a portion of at least one host device coupled to the storage system via at least one network.

11. The apparatus of claim 10 wherein said at least one host device comprises a multi-path layer, the multi-path layer comprising at least one multi-path input-output driver configured to control delivery of input-output operations from said at least one host device to the storage system over selected paths through the network.

12. The apparatus of claim 11 wherein said at least one multi-path input-output driver is configured to perform at least a portion of maintaining the mapping data structure, identifying the source logical storage device, accessing the mapping data structure, selecting the target logical storage device and initiating the migration process.

13. The apparatus of claim 1 wherein said at least one processing device is further configured to generate a warning responsive to the timestamp of the source logical storage device being later in time than at least one of the one or more additional timestamps of one or more respective candidate target logical storage devices.

14. The apparatus of claim 1 wherein said at least one processing device is further configured to present a force option to a user to allow the user to select a particular one of a plurality of candidate target logical storage devices that has a timestamp that is earlier in time than the timestamp of the source logical storage device.

15. A computer program product comprising a non-transitory processor-readable storage medium having stored therein program code of one or more software programs, wherein the program code, when executed by at least one processing device comprising a processor coupled to a memory and configured to communicate over a network with a storage system, causes said at least one processing device:
    to maintain a mapping data structure comprising a plurality of mapping entries, each such mapping entry associating an assigned name of a corresponding logical storage device of a storage system with a unique identifier of that logical storage device, a given such mapping entry further comprising a timestamp associated with the logical storage device;
    to identify a source logical storage device for a migration process;
    to access the mapping data structure to determine a timestamp of the source logical storage device and one or more additional timestamps of one or more respective candidate target logical storage devices for the migration process;
    to select based at least in part on the determined timestamps a particular one of the one or more candidate target logical storage devices; and
    to initiate the migration process to migrate the source logical storage device to the selected target logical storage device;
    wherein the mapping data structure comprises at least one entry for a respective at least one candidate target logical storage device having a timestamp that is earlier in time than the timestamp of the source logical storage device, and the selecting is configured to prevent inadvertent utilization in the migration process of the at least one candidate target logical storage device having the timestamp that is earlier in time than the timestamp of the source logical storage device.

16. The computer program product of claim 15 wherein selecting based at least in part on the determined timestamps comprising selecting a particular one of a plurality of candidate target logical storage devices that has a timestamp that is later in time than the timestamp of the source logical storage device.

17. The computer program product of claim 15 wherein selecting based at least in part on the determined timestamps comprising selecting a particular one of a plurality of candidate target logical storage devices at least in part responsive to user input.

18. A method comprising:
    maintaining a mapping data structure comprising a plurality of mapping entries, each such mapping entry associating an assigned name of a corresponding logical storage device of a storage system with a unique identifier of that logical storage device, a given such mapping entry further comprising a timestamp associated with the logical storage device;
    identifying a source logical storage device for a migration process;
    accessing the mapping data structure to determine a timestamp of the source logical storage device and one or more additional timestamps of one or more respective candidate target logical storage devices for the migration process;
    selecting based at least in part on the determined timestamps a particular one of the one or more candidate target logical storage devices; and
    initiating the migration process to migrate the source logical storage device to the selected target logical storage device;
    wherein the mapping data structure comprises at least one entry for a respective at least one candidate target logical storage device having a timestamp that is earlier in time than the timestamp of the source logical storage device, and the selecting is configured to prevent inadvertent utilization in the migration process of the at least one candidate target logical storage device having the timestamp that is earlier in time than the timestamp of the source logical storage device; and
    wherein the method is performed by at least one processing device comprising a processor coupled to a memory.

19. The method of claim 18 wherein selecting based at least in part on the determined timestamps comprising selecting a particular one of a plurality of candidate target logical storage devices that has a timestamp that is later in time than the timestamp of the source logical storage device.

20. The method of claim 18 wherein selecting based at least in part on the determined timestamps comprising selecting a particular one of a plurality of candidate target logical storage devices at least in part responsive to user input.

* * * * *